United States Patent [19]

Tan

[11] Patent Number: 4,987,698

[45] Date of Patent: Jan. 29, 1991

[54] MUSHROOM CULTIVATION

[75] Inventor: Kok-Kheng Tan, Singapore, Singapore

[73] Assignee: Everbloom Mushroom (PTE) Ltd., Singapore

[21] Appl. No.: 277,823

[22] Filed: Nov. 30, 1988

Related U.S. Application Data

[63] Continuation-in-part of Ser. No. 57,335, Jun. 2, 1987, Pat. No. 4,833,821.

[30] Foreign Application Priority Data

Jun. 3, 1986 [GB] United Kingdom ............. 8613360

[51] Int. Cl.$^5$ ............................................. A01G 1/04
[52] U.S. Cl. ................................................. 47/1.1
[58] Field of Search ..................................... 47/1.1

[56] References Cited

U.S. PATENT DOCUMENTS

| | | | |
|---|---|---|---|
| 3,940,883 | 3/1976 | Kusahara et al. | 47/1.1 |
| 4,071,973 | 2/1978 | Iizuka et al. | 47/1.1 |
| 4,083,145 | 4/1978 | Fuzisawa et al. | 47/1.1 |
| 4,637,163 | 1/1987 | Pellinen et al. | 47/1.1 |
| 4,646,466 | 3/1987 | Ulah | 47/1.1 |
| 4,674,228 | 6/1987 | Murata et al. | 47/1.1 |

FOREIGN PATENT DOCUMENTS

| | | | |
|---|---|---|---|
| 2750009 | 5/1978 | Fed. Rep. of Germany | 47/1.1 |
| 3201727 | 12/1982 | Fed. Rep. of Germany | 47/1.1 |
| 45-9803 | 4/1970 | Japan | 47/1.1 |
| 47-38992 | 10/1972 | Japan | 47/1.1 |
| 47-39026 | 10/1972 | Japan | 47/1.1 |
| 50-39012 | 12/1975 | Japan | 47/1.1 |
| 8056614 | 9/1981 | Japan | 47/1.1 |
| 2198337 | 9/1987 | Japan | 47/1.1 |

OTHER PUBLICATIONS

San Antonio, J. P., "Cultivation of Shiitake Mushroom", *Hort. Science*, vol. 16(2), Apr. 1981, pp. 151–156.

*Primary Examiner*—James R. Feyrer
*Attorney, Agent, or Firm*—Venable, Baetjer, Howard & Civiletti

[57] ABSTRACT

A method of cultivating wood-decaying edible fungi, comprises mixing spawn of the fungi with a substrate comprising comminuted wood which has been hydrated and sterilized or pasteurized, exposing the mixture to conditions under which the spawn will grow and fruit, and subjecting the spawn-run substrate to thermal shock comprising sequentially raising, lowering and raising the temperature, to 28°–30° C., 10°–15° C. and 20°–25° C., respectively.

8 Claims, No Drawings

4,987,698

MUSHROOM CULTIVATION

RELATION TO EARLIER APPLICATION

This Application is a continuation-in-part of my Application Ser. No. 57,335, filed June 2, 1987 now U.S. Pat. No. 4,833,821 issued May 30, 1989.

FIELD OF THE INVENTION

Many mushrooms are now cultivated intensively as opposed to being allowed to grow under reasonably wild conditions. This invention relates to the cultivation of mushrooms, particularly white rot fungi.

BACKGROUND OF THE INVENTION

White rot fungi are wood-decaying fungi which grow on a ligno-cellulose base as opposed to coprophilous fungi, for example, the Champignon mushroom, which grow by decomposing dung or compost. Examples of edible woodrotting fungi include the abalone or oyster mushrooms such as *Pleurotus cystidiosus* (*P. abalonus*), *P. ostreatus* (both grey and white types), *P. cornucopiae, P. sajor caju* and also the Shiitake or Chinese black forest mushroom known by the botanical name of *Lentinus edodes*. Of these, the Shiitake mushroom is the most difficult to grow because it grows only on wood whereas the other mushrooms will grow on almost any sort of cellulose base such as cotton waste or straw. The Shiitake mushroom apparently requires lignin as well as cellulose as a base for growth.

The traditional manner of cultivating Shiitake mushrooms is by the inoculation of wooden blocks with spawn. The blocks are left for many months to enable the spawn to grow through the block, after which fruiting occurs. Cultivation is chancy, and yield and time to fruiting are not particularly satisfactory.

PRIOR ART

U.S. Pat. No. 1,833,089 discloses cultivating mushroom spawn on a substrate comprising sawdust and bran which is heat-sterilised and cooled before addition of the spawn.

U.S. Pat. No. 4,127,965 discloses cultivating Shiitake and other mushrooms on a substrate comprising cellulosic material, preferably in tree log form, and nutrients.

Ando, Proc. Ninth Int. Sci. Congress on the Cultivation of Edible Fungi, Tokyo 1974, pages 415-421, discloses using a variety of media for growing Shiitake mushrooms. Artificial media gave fruit-body formation in about 40 days, and sawdust media (of *Castanopsis cuspidata* or *Faqus crenata*) in about 70 days.

My U.S. Pat. No. 4,542,608 describes swelling cereal grain in water, sterilising the grain, inoculating the sterile grain with a mushroom culture, and incubating the inoculated grain.

Iizuka et al, in U.S. Pat. No. 4,071,973, disclose growing edible fungi by culturing an inoculum on a substrate, and subjecting the then prevalent hypha to a high temperature treatment (25-32° C.), a subsequent low temperature treatment (5-8° C.), and then a cool water treatment (3-6° C.), before recovering the fungus after placing the hypha in a room at 10-16° C. Movement between rooms and an oxygen supply are required, in addition to immersion.

East German Pat. No. 230,748 describes storing mushrooms at 18-25° C., followed by a cold shock at 10° C., and subsequently harvesting the fruit.

SUMMARY OF THE INVENTION

It has been found that mushrooms, e.g. Shiitake mushrooms, can be caused to fruit very effectively by induction at a particular stage of the growth cycle, and subsequent thermal shock without undue temperature changes.

DESCRIPTION OF THE INVENTION

Comminuted wood is used as a substrate in the process of the invention. It is hydrated to about 60-70% by weight, and is then sterilised or pasteurised to kill off any unwanted spores. More than one sterilisation or pasteurisation step may be appropriate, there being a period between consecutive sterilisations or pasteurisations, to enable any viable spore contaminants to germinate. The method and conditions of sterilisation or pasteurisation will depend upon the likely contamination of the initial wood and the spore content of the surrounding environment.

Before or after sterilisation or pasteurisation, and before or after cooling and the addition of mushroom spawn, the substrate is conveniently filled into one or more containers such as trays, shelves or bags of any suitable size. For example, the substrate can also be used to fill plastics material bags, e.g. polypropylene bags which are about 90-105 mm in diameter, which are then compressed to a height of about 150 to 210 mm. The bags are stoppered with a foam plug which can withstand autoclaving temperatures and steam sterilisation, e.g. for 1 to 2 hours at 121° C. or more generally up to 140° C.

The sterilised or pasteurised substrate, e.g. in bags, is then mixed or inoculated with spawn, e.g. prepared as described in my U.S. Pat. No. 4,542,608, the contents of which are incorporated herein by reference. The bags are left to allow the substrate to be fully colonised by the spawn before fruiting. It may, for example, take up to 8 weeks to enable the spawn to penetrate fully throughout the mass of the substrate. If the mixture is in bags, the tops of the bags are then opened. Buds appear within a week and, within a further few days, the resulting mushroom fruit is ready for cropping.

It has been found that, to promote growth of the mushrooms, it is also desirable to add a nutrient mix to the comminuted wood on which edible wood rotting fungi spawn is to be cultivated. The nutrient mix comprises a carbon source and any other components which facilitate growth, e.g. rice bran. Nutrients may be conventional; many are described in U.S. Pat. No. 4,127,965.

Once the nutrient mix has been thoroughly mixed with the comminuted wood, the overall mixture must be wetted. Preferably water is added in a proportion of from 40 to 70% based on the overall weight of the original dry mix. Care should be taken, however, to avoid the addition of water in an amount which might cause the leaching out of many of the chemical nutrients from the overall mixture.

As indicated above, the resulting mixture is sterilised or pasteurised after hydration, to kill off unwanted spores which can compete with the desired mushroom growth. The sterilised or pasteurised substrate (comprising comminuted wood particles and optionally added nutrients) is inoculated with a spawn culture of the mushrooms, e.g. spawn prepared as described in my U.S. Pat. No. 4,542,608. A period of spawn-run is allowed to enable the spawn to colonise the mixture throughout.

Fruiting can follow, after which the mushrooms are ready for harvesting. However, the present invention seeks to avoid fruiting at different times, because it is desirable, in intensive cultivation, to have all the mushrooms in a particular growing area and for the mushrooms to fruit at about the same time so as to facilitate efficient cropping. To this end, after the spawn has been allowed to penetrate throughout the substrate, the substrate is subjected to thermal shock, to induce fruiting. At least part of the spawn-covered substrate is exposed to normal cropping conditions of light and temperature, to allow fruiting bodies (mushrooms) to develop, after which the mature mushrooms are cropped. Again, the cropped substrate is subjected to thermal shock to induce fruiting, followed by normal cropping conditions. The cycle may be carried out up to 6 to 8 times before the cellulose and lignin from the wood substrate are exhausted, making it incapable of supporting further cropping.

Thermal induction can be achieved by subjecting the substrate to a temperature of about 28° C. 30° C. is about the maximum temperature which will not result in destruction of the Shiitake fungus. The substrate is kept at this relatively high temperature for about 1 to 7 days to allow the fungus to rest, after which the temperature is reduced to about 10 to 15° C, e.g. 10° C., for generally 1 to 5 days. Such temperatures are relatively cold for growing, but some growth does occur at these lower temperatures. The shock in the change from relatively high temperature to a low temperature induces efficient fruiting of the fungus. The temperature of the substrate is then raised to an optimum cropping temperature which is of the order of 20° C., for 7 to 10 days. Normal growth of the fungus is promoted by watering to maintain normal cropping conditions which involves keeping reasonable humidity and adequate lighting and ventilation conditions.

By repeating the cycle of induction and normal fruiting, fruiting can be induced at about the same time in a particular growing region and so the efficiency of picking can be high. In particular, a huge number of sterilised bags or other containers can be processed in accordance with the invention in a single room, without movement, immersion or a separate oxygen supply, by temperature control. The temperature changes required by the invention are not great, e.g. +3° C., −18° C., +10° C. (before raising the temperature by 5° C. for another cycle). There may be, for example, more than 1,000, preferably 10,000 up to 40,000 or more bags in one temperature-controlled area, based on a bag weight of 600 g/1000 g hydrated. As is conventional, part of the bag is removed when cropping. Good yields of mushrooms are achieved and substantially all of the cellulose and lignin in the substrate on which the Shiitake fungus grows can be used up.

The following Example illustrates the invention.

EXAMPLE

One part by weight rice bran was mixed with 4 parts by weight of green sawdust. Water was added, to a degree of hydration of at least 60%. The resultant composition was filled into polypropylene bags and stoppered by a polypropylene collar and cap assembly which allowed exchange of air but prevented contamination. The composition was sterilised for 45 to 60 minutes in an autoclave at 140° C. by steam. When the sterilised composition was cool, mushroom spawn (Lentinus edodes) was added. The composition was then left, to allow colonisation for 6 to 10 weeks at 25° C.

High humidity (above 90%) was maintained throughout the growth phase, by watering. The humidity level was subsequently reduced, before cropping.

The colonised substrate was subjected to thermal shock, i.e. warming to 28° C. for 4 days, cooling to 10° C for 4 days, and warming to 20° C. for 10 days. This last stage provided the optimum temperature for cropping. Six flushes of mushrooms were harvested before the substrate was spent.

I claim:

1. A method of cultivating wood-decaying edible fungi, which comprises allowing spawn of the fungi to colonise and grow at about 25° C., on a substrate comprising comminuted wood which has been hydrated and rendered free of unwanted spores, and inducing fruiting by subjecting the spawn-run substrate to thermal shock comprising sequentially raising, lowering and raising the temperature, to 28-30° C., 10-15° C. and 20-25° C., respectively with the initial raising and lowering steps being of a duration of at least 1 day.

2. A method according to claim 1, wherein the wood-decaying fungi are Shiitake mushrooms.

3. A method according to claim 1, wherein the comminuted wood has a particle size of up to 3 mm.

4. The method of claim 1, further comprising cropping the fungi.

5. The method of claim 1 wherein the step of inducing fruiting is repeated one or more times.

6. The method of claim 4 wherein the steps inducing fruiting and cropping the fungi are repeated one or more times.

7. A method of cultivating wood-decaying edible fungi, comprising:
  (a) allowing spawn o the fungi to colonize and grow at about 25° C. on comminuted wood which has a particle size up to 3 mm, which has been hydrated and which has been rendered free of unwanted spores; and
  (b) inducing fruiting by a three step sequence of raising the temperature to 28-30° C. for about 1 to 7 days, lowering the temperature to 10-15° C. for about 1 to 5 days and raising the temperature to 20-25° C. for 7 to 10 days; and
  cropping;
wherein the humidity level is maintained above 90% until cropping.

8. The method of claim 7 wherein the steps of inducing fruiting and cropping the fungi are repeated.

* * * * *